US007197364B2

(12) United States Patent
Chernoff et al.

(10) Patent No.: US 7,197,364 B2
(45) Date of Patent: Mar. 27, 2007

(54) PORTABLE ELECTRONIC CONTROLLER

(75) Inventors: Adrian B. Chernoff, Royal Oak, MI (US); Kevin G. Kolpasky, Sterling Heights, MI (US)

(73) Assignee: General Motors Corporation, Detroit, MI (US)

(*) Notice: Subject to any disclaimer, the term of this patent is extended or adjusted under 35 U.S.C. 154(b) by 562 days.

(21) Appl. No.: 10/770,933

(22) Filed: Feb. 3, 2004

(65) Prior Publication Data

US 2005/0177252 A1 Aug. 11, 2005

(51) Int. Cl.
*B60L 1/00* (2006.01)
*G09G 3/00* (2006.01)

(52) U.S. Cl. .................... 700/9; 700/17; 700/9; 700/25; 700/276; 340/3.1; 340/3.2; 340/3.71; 340/3.9; 361/683; 361/684; 361/685; 361/686; 701/2; 370/310

(58) Field of Classification Search ................ 700/277; 701/1, 29, 36; 340/539.1, 447, 825.52
See application file for complete search history.

(56) References Cited

U.S. PATENT DOCUMENTS

| | | | | |
|---|---|---|---|---|
| 4,731,769 | A | 3/1988 | Schaefer et al. | 369/6 |
| 5,794,164 | A | 8/1998 | Beckert et al. | 701/1 |
| 5,818,347 | A * | 10/1998 | Dolan et al. | 340/825.52 |
| 5,971,597 | A * | 10/1999 | Baldwin et al. | 700/277 |
| 6,032,089 | A | 2/2000 | Buckley | 701/36 |
| 6,396,164 | B1 | 5/2002 | Barnea et al. | 307/10.1 |
| 6,434,459 | B2 * | 8/2002 | Wong et al. | 701/36 |
| 6,472,771 | B1 * | 10/2002 | Frese et al. | 307/10.1 |
| 6,507,810 | B2 * | 1/2003 | Razavi et al. | 703/24 |
| 6,686,711 | B2 * | 2/2004 | Rose et al. | 318/16 |
| 6,909,947 | B2 * | 6/2005 | Douros et al. | 701/29 |
| 7,027,772 | B2 * | 4/2006 | Chen et al. | 455/41.1 |
| 7,053,761 | B2 * | 5/2006 | Schofield et al. | 340/447 |
| 2001/0016789 | A1 * | 8/2001 | Staiger | 701/1 |
| 2002/0032048 | A1 | 3/2002 | Kitao et al. | |
| 2002/0120371 | A1 | 8/2002 | Leivian et al. | |
| 2002/0120374 | A1 | 8/2002 | Douros et al. | |

(Continued)

FOREIGN PATENT DOCUMENTS

EP 1125784 A2 8/2001

OTHER PUBLICATIONS

"Volkswagen T-Concept Unifies the SUV and Sports Car", www.gizmo.com.au/public/news, Jan. 2004.

(Continued)

*Primary Examiner*—Anthony Knight
*Assistant Examiner*—Sunray Chang
(74) *Attorney, Agent, or Firm*—Kathryn A. Marra

(57) ABSTRACT

A portable electronic device includes a communication component, an integral display operatively connected to the communication component, an operator input component operatively connected to the display and a processing component operatively connected to the communication component, to the display and to the operator input component. The communication component communicates with external electronic devices via a common software interface to send data to and receive data from the devices and to send control signals to the devices to control the operation of the devices. The processing component processes an operator's input to the operator input component and data received by the communication component to formulate the control signals. A method of controlling external electrical components is also provided.

18 Claims, 3 Drawing Sheets

U.S. PATENT DOCUMENTS

| | | | | |
|---|---|---|---|---|
| 2003/0043019 | A1 | 3/2003 | Tanaka et al. | |
| 2003/0065432 | A1 | 4/2003 | Shuman et al. | |
| 2003/0080619 | A1 | 5/2003 | Bray et al. | |
| 2005/0040943 | A1* | 2/2005 | Winick | 340/539.1 |

OTHER PUBLICATIONS

"Radical Nissan Actic Concept", www.gizmo.com.au/public/news, Jan. 2004.

* cited by examiner

PORTABLE ELECTRONIC CONTROLLER

TECHNICAL FIELD

This invention relates to the control of electronic devices.

BACKGROUND OF THE INVENTION

A typical surrounding environment, whether a home, a business setting or a vehicle, includes an increasing number of electronic devices. To a large extent, each electronic device is equipped with separate controls for its operation. Accordingly, it is often necessary to interact with a multitude of separate controls for different electronic devices. This becomes increasingly time-consuming as the number of available electronic devices increases. For instance, controls for electronic devices on a vehicle are disbursed throughout the vehicle and are generally located within the reach of the driver to the exclusion of other passengers. Passengers may have limited access to some controls, such as their adjacent window or seat. When a passenger moves to a different seat in a vehicle or transfers to a different vehicle, the passenger generally must manually reset local controls, such as for a window or a local speaker, to achieve individually-preferred settings.

SUMMARY OF THE INVENTION

An electronic controller is capable of controlling the function of external electrical devices located in a given environment, such as on a vehicle (e.g., an automobile or an airplane), as well as external electrical devices located in a remote location such as a building or another vehicle. As used herein, "external electronic devices" means devices at least a component of which are electronic and that are external to the electronic controller. The electronic controller is portable between different surrounding environments (e.g., from vehicle to vehicle or from a vehicle to a residential building). Additionally, the electronic controller is capable of storing preferred settings for the external electronic devices so that an individual may use the electronic controller to control the function of selected ones of the external electrical devices according to his or her preferred settings (e.g., audio volume or Internet user identification and password may be stored, preferred settings) without having to repeatedly reenter or reprogram the preferred setting into each respective device.

A typical surrounding environment containing external electronic devices has different zones or areas. A first set of external electronic devices is located in a first area and a second set of electronic devices is located in a second area. An operator of the electronic controller is able to scroll through a listing of available areas displayed on an integral display. The operator may select an area, and thereby establish control over the external electronic devices located in the selected area. Thus, an individual can move from area to area in a surrounding environment, such as a vehicle, conveniently controlling their immediate surrounding area via the electronic controller and quickly relaying preferred settings stored in the controller.

Accordingly, a portable electronic controller adapted for controlling the operation of external electronic devices includes a communication component. An integral display is operatively connected to the communication component. An operator input component is operatively connected to the integral display. Furthermore, a processing component is operatively connected to the operator input component, to the communication component and to the integral display. Preferably, the communication component has a software interface common with the external electronic devices to be controlled that permits the communication component to communicate with the external electronic devices to receive data from and to send data and control signals to the external electronic devices. The control signals control the operation of selected external electronic devices. The processing component processes operator input applied to the operator input component and the data received by the communication component to formulate the control signals sent by the communication component.

Preferably, the electronic controller also includes a data storage component that is operatively connected to the communication component and to the processing component. The data storage component is able to store an operator's input to the operator input component as well as data received by the communication component. The data storage component may have many uses such as storing preferred games, music and videos on the controller. Additionally, the data storage component is critical when the controller does not initially have a common software interface with one or more of the external electronic devices. In that instance, if the controller has a common communication protocol with the external electronic device(s), the communication component is able to receive data from the external electronic device(s) and the data is then stored in the data storage component (i.e., the data is information necessary to establish the common software interface; it is downloaded to the controller). The data is processed by the processing component to establish the necessary common software interface that permits the communication component to send data and control signals to the external electronic device(s).

Preferably, the electronic controller is selectively connectable to an external display screen for displaying the stored data on the display screen. Thus, downloaded or stored data, such as favorite videos may be displayed on the external display screen. The controller may include a sensor for measuring one or more surrounding conditions. The sensor sends data representing the measured conditions to the data storage component. The processing component then formulates the control signal in accordance with the measured conditions. Thus, an external electronic device, such as an HVAC system, may be adjusted by the control signal so that a measured condition (such as temperature) will reflect a preferred temperature setting.

The processing component may include an algorithm that is able to compare operator input currently being processed with previously processed operator input and thereby identify repeated processing of substantially identical operator input resulting in the repeated formulation of substantially identical control signals. The processing component may then selectively formulate such a substantially identical control signal even in the absence of immediate operator input. Preferably, the processing component is able to process time data that is either received by the communication component from one of the external electronic devices or is relayed by a clock mounted to the controller. The algorithm is then able to identify the times of day that the substantially identical operator input is entered. The selectively formulated identical control signal may then also be correlated with the identified times of entry.

Also preferably, the external electronic devices may be operatively connected to form a network. The external electronic devices may be operatively connected to the common software interface via the network.

The external electronic devices may be located in a first surrounding environment that includes and is defined by at least a first area and a different second area. A first set of the external electronic devices is in the first area and a second set of the external electronic devices is located in the second area. The data received by the communication component from the external electronic devices includes a listing of the first and second areas. The listing of the areas is displayed on the integral display. An operator of the controller is able to input a selection of one of the listed areas. The data sent to the external electronic devices from the communication component includes the operator's selection of one of the listed areas. The selection establishes operational control of the external electronic devices in the selected area by the control signal sent from the communication component. By so selecting and establishing operational control of the selected, listed area, the controller may exclude another portable electronic controller from establishing operational control of the selected area. Thus, for instance, a passenger in the left rear seat of the vehicle may control the volume of the speaker located in that region and exclude a passenger in the right rear seat of the vehicle from controlling the volume of that speaker.

Because the electronic controller is portable, it may be transported from a first surrounding environment such as a vehicle to a second surrounding environment such as a building. Other external electronic devices are located in the second environment as well. Preferably, the communication component shares a common software interface with those other external electronic devices. Accordingly, the communication component is likewise able to communicate with those other external electronic devices via the common software interface to receive data from and to send data and control signals to those external electronic devices. Likewise, the processing component processes an operator's input to the operator input component and the data received by the communication component to formulate the control signals to be sent to such other external electronic devices by the communication component.

The external electronic devices may be located on a vehicle and may include an on-board engine diagnostic unit, on-board sensors, a vehicle video system, a vehicle audio system, a vehicle heating, ventilation and air conditioning (HVAC) system, display screens, vehicle windows and vehicle seats. A second surrounding environment to which the controller is portable may be a second vehicle. Furthermore, the second surrounding environment may be a building. External electronic devices that may be located either on a vehicle or at a remote location such as a building may include a satellite-based navigation system, a phone, a satellite-based entertainment system, an Internet access component and a digital broadcast system. The surrounding environment may be a residential building and the external electronic devices may include a home audio system, a security system for the building, lighting for the building or electronic appliances.

The communication component may receive the data from and send the formulated control signals to the external electronic devices in a "plug-and-play" manner. As will be know to those skilled in the art, "plug-and-play" means that the electronic controller physically connects to the external electronic devices, e.g., via a USB cable, and can communicate with the external electronic devices instantaneously (without "rebooting" the controller) after the connection is made. Alternatively, the communication component may receive data from and send formulated control signals to the external electronic devices in a wireless manner. Those skilled in the art will recognize a variety of wireless technologies applicable, including Bluetooth.

Within the scope of the invention, the surrounding environment may be a vehicle having a structural frame to which the external electronic devices are mounted. A second electronic controller may be mounted to the vehicle and able to receive operator input and data from the external electronic devices and send control signals to the external electronic devices for controlling the function thereof, based on the operator input and received data. Preferably, the vehicle includes a vehicle operation sensor that is mounted to the vehicle for sensing when the vehicle is being driven. A lockout component is operatively connected to the vehicle operation sensor and to the second electronic controller. The lockout component prevents the second electronic controller from sending control signals to at least one of the external electronic devices when the vehicle operation sensor senses that the vehicle is being driven. For instance, the second electronic controller may be mounted to the steering wheel and the lockout component may prevent the operator (i.e., the driver) from adjusting the audio system treble while driving.

A method of controlling electronic devices via a portable electronic controller is provided. The external electronic devices are located in a first surrounding environment and include a first external electronic device. The method includes positioning the portable electronic controller in the first surrounding environment. The method further includes communicating with the first external electronic device via a communication component of the portable electronic controller to send data to and to receive data from the first external electronic device. The external electronic devices and the communication component have a common software interface enabling such communication. The method further includes displaying the received data on a display of the portable electronic controller. The method further includes processing an operator's input based on the displayed received data in a processing component of the electronic controller to formulate a control signal. The operator input is applied to an operator input component of the electronic controller. The method also includes sending the formulated control signal via the communication component to the first external electronic device for controlling the function thereof.

Preferably, the operator input represents a preferred setting of the first external electronic device. The method then further includes storing the operator input in a data storage component of the portable electronic controller. The method includes repositioning the electronic controller to a second surrounding environment different than the first surrounding environment and having other external electronic devices including a second external electronic device. The first and second external electronic devices have an equivalent function. For example, they may each be speakers in a vehicle. The method then includes sending another formulated control signal to the second external electronic device for controlling the equivalent function thereof. This formulated control signal is formulated based upon the stored operator input representing the preferred setting (e.g., a preferred audio volume level). Accordingly, the second external electronic device is controlled according to the preferred setting without reentering the preferred setting into the controller.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
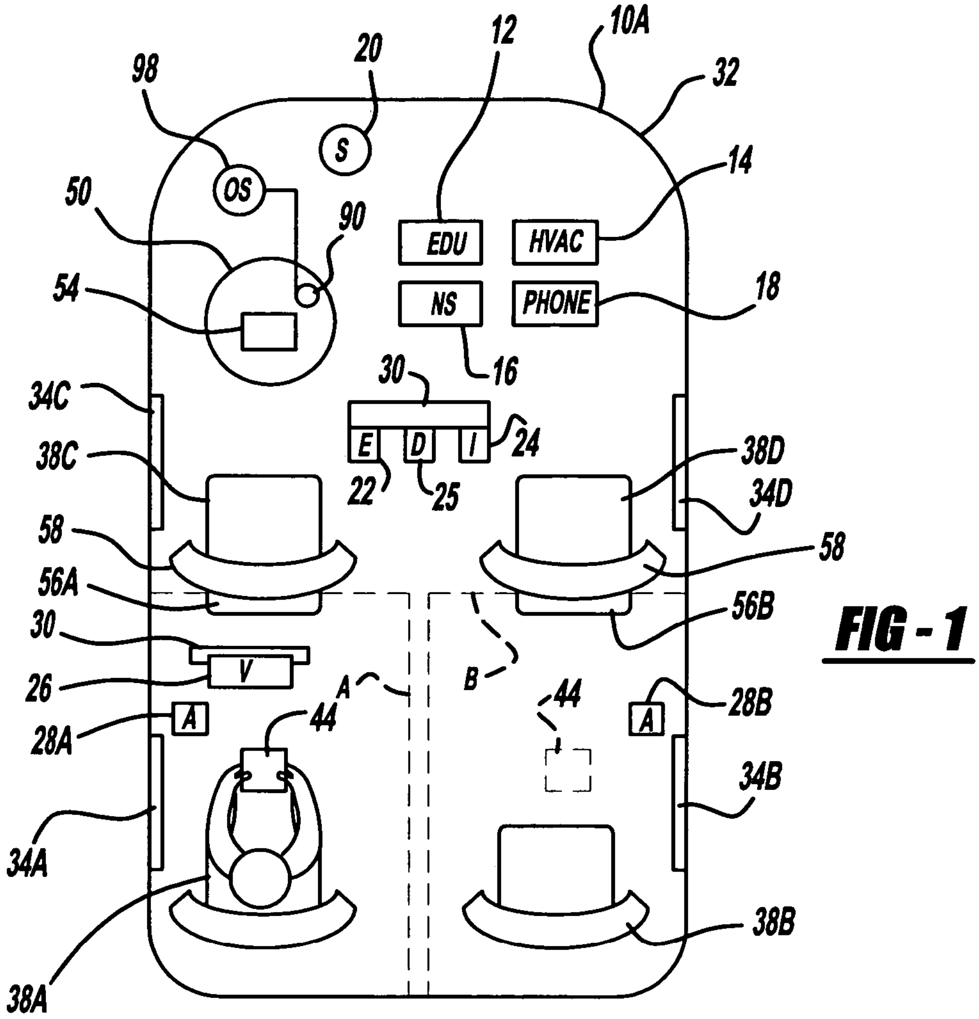
FIG. 1 is a schematic illustration in plan view of a vehicle having a first electronic controller and a second electronic controller for controlling external electronic devices.

Referring to the drawings, wherein like reference numerals refer to like components, FIG. 1 depicts a vehicle 10A. The vehicle 10A includes a variety of external electronic devices such as an engine diagnostic unit 12, a heating, ventilation and air conditioning (HVAC) system 14 and a satellite-based navigational system 16. Additional external electronic devices include a phone 18, which may be cellular, onboard sensors 20 for sensing various vehicular conditions, a satellite-based entertainment system 22, an Internet access component 24, a digital broadcast system 25, a vehicle video system 26, a left passenger vehicle audio system 28A, and a right passenger vehicle audio system 28B. Each of the above-described external electronic devices is mounted to the vehicle 10A (i.e., each is mounted with respect to a structural frame 32 of the vehicle 10A). Thus, the vehicle 10A is a first surrounding environment for the external electronic devices. The entertainment system 22, the Internet access system 24, the digital broadcast component 25 and the vehicle video system 26 are depicted as being mounted to vehicle headliners 30, but may be mounted elsewhere within the scope of the invention.

The vehicle 10A includes a plurality of windows including a left passenger window 34A, a right passenger window 34B, a driver's window 34C and a front passenger window 34D. The vehicle 10A further includes a plurality of seats including a left passenger seat 38A, a right passenger seat 38B, a driver's seat 38C and a front passenger seat 38D. The left passenger window 34A and the left passenger seat 38A are located generally within a first zone or area A denoted by phantom lines. The right passenger seat 38B and the right passenger window 34B are generally located within a zone or area B denoted by phantom lines. The zones A, B partially define the structural frame 32. The zones are representational and may extend to include additional electronic devices within the vehicle 10A; alternatively, the vehicle 10A may be divided into a plurality of differently configured zones. For instance, an area surrounding the driver's seat 38C and an area surrounding the front passenger seat 38D may constitute additional zones within the vehicle 10A. Vehicles of different body types (i.e., different structural frames) such as sport coupes, pick-up trucks and vans may be characterized by a variety of differently configured zones.

Figure 2A:
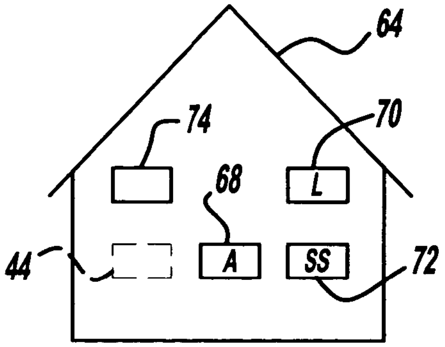
FIG. 2A is a schematic illustration in side view of a residence having other external electronic devices controllable by the portable first electronic controller.

A first electronic controller 44 is depicted within the first zone A. The first electronic controller 44 is portable and may be moved to the second zone B as shown in phantom or to another location within the vehicle 10A. The left passenger audio system 28A is located within the zone A and the right passenger audio system 28B is located within the zone B. Additionally, as shown in FIG. 2A, the electronic controller 44 may be moved to a remote location outside of the vehicle such as a building 64, which may be residential. Because the controller 44 is designed to be portable, it may be rechargeable. Thus, it may be advantageous to equip the vehicle 10A with recharging ports (not shown) for recharging the controller. For instance, a recharging port may be mounted within each zone, allowing multiple passengers to each recharge their own separate controllers at the same time.

Referring again to FIG. 1, a steering component 50 (e.g., a steering wheel) is located on the vehicle 10A for steering the vehicle 10A. A second electronic controller 54 is mounted within the steering wheel 50. The second electronic controller 54 may alternatively be mounted elsewhere on the vehicle 10A and there may be more than one second controller 54 (e.g., there may be a like controller mounted at each seat); however, the second electronic controller 54 is not portable. Furthermore, display screens 56A and 56B are mounted on seatbacks 58 of seats 38C and 38D located forward of seats 38A and 38B, respectively.

Figure 2B:
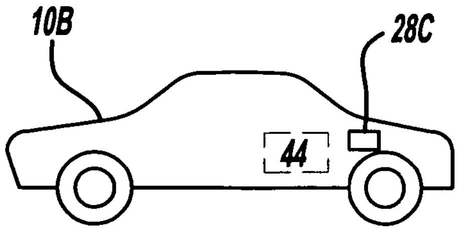
FIG. 2B is a schematic illustration of another vehicle having still other external electrical devices controllable by the first electronic controller of FIG. 1.

Referring now to FIG. 2A, a passenger may exit the vehicle 10A of FIG. 1 and carry the first electronic controller 44 to a second surrounding environment at a remote location, such as the building 64. The building 64 contains a variety of external electronic devices. For example, a home audio system 68, a lighting system 70, a security system 72 and an electrical appliance 74 (such as a washing machine or a television) are located within the building 64. Referring now to FIG. 2B, the first electronic controller 44 is portable to a second vehicle 10B. The second vehicle 10B includes a plurality of external electronic devices such as a vehicle audio system 28C.

Figure 3A:
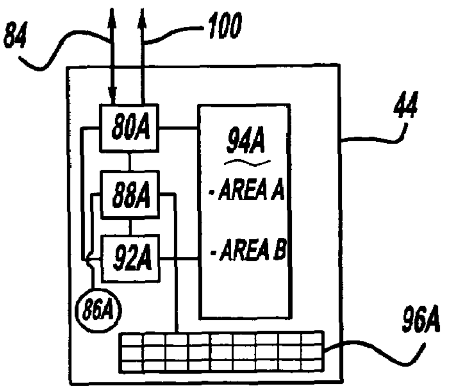
FIG. 3A is a schematic illustration in plan view of the portable first electronic controller of FIG. 1.

Referring to FIG. 3A, the portable electronic controller 44 is shown in greater detail. The electronic controller 44 includes a communication component 80A. The communication component 80A is able to receive data 84 from external electronic devices including those on the vehicle 10A of FIG. 1, those on the vehicle 10B of FIG. 2B, and those in the building 64 of FIG. 2A. A data storage component 88A is operatively connected to the communication component 80A and is able to store the data 84 received by the communication component 80A. A processing component 92A is connected to the data storage component 88A. An operator input component 96A relays operator input to the data storage component 88A and to the processing component 92A. The operator input component may be a keyboard or other known input means, including dedicated buttons, a touch screen (activated by finger touch or pen), a joystick, a rotary knob or voice activation. Operator input may include a preferred setting for one of the external electronic devices, such as a preferred volume or radio station of the audio systems 28A–C. Other examples of preferred settings are lighting, seat features (recline, lumbar, heat/cool, massage), HVAC climate settings, and favorite radio and television stations. The processing component 92A is connected to the data storage component 88A as well as to the communication component 80A. The processing component 92A processes data received by the data storage component 88A and processes operator input to formulate control signals 100. The communication component 80A sends the formulated control signals 100 to the external electronic devices for controlling the function thereof. Accordingly, preferred settings that are entered by an operator as operator input (and which may be stored within the data storage component 88A) may be formulated into control signals 100 and sent to respective external electronic devices to control such electronic devices according to the operator input and the preferred settings. For instance, a preferred seat tilt may be stored in the data storage component 88A by an operator and relayed to a seat 38A, 38B, 38C or 38D of FIG. 1 to control the positioning of the seat 38A, 38B, 38C or 38D.

Preferably, the data storage component 88A has at least 30 gigabytes of memory. Accordingly, the data storage component 88A is sufficiently sized to upload favorite music, videos and other information (i.e., data 84) to the external electronic devices via the communication component 80A or download such from the external electronic devices. Once established (i.e., once initially entered as operator input), preferred settings may be communicated from the controller 44 to an external data storage component (not shown) and later accessed by the controller 44. In fact, because the controller 44 has communication, processing and data storage capabilities, it may be designed such that it may separately and independently function as a device such as a phone, PDA or an MP3 player, in addition to its capabilities in functioning as a controller of external electronic devices.

Referring to FIG. 3A, the electronic controller 44 includes an integral display 94A. The integral display 94A displays the data received by the communication component 80A and also displays operator input entered via the operator input component 96A. Notably, Referring to FIG. 1, the electronic controller 44 is connectable to external display screens 56A and 56B for displaying the received data 84, stored data or the operator input. Accordingly, the electronic controller 44 allows for flexible displays (e.g., the operator may choose to display operator input and/or stored or received data on the integral display 94A and/or on the external displays 56A, 56B). Stored data, such as downloaded videos, may be shown on the external display screens 56A, 56B.

Figure 3B:
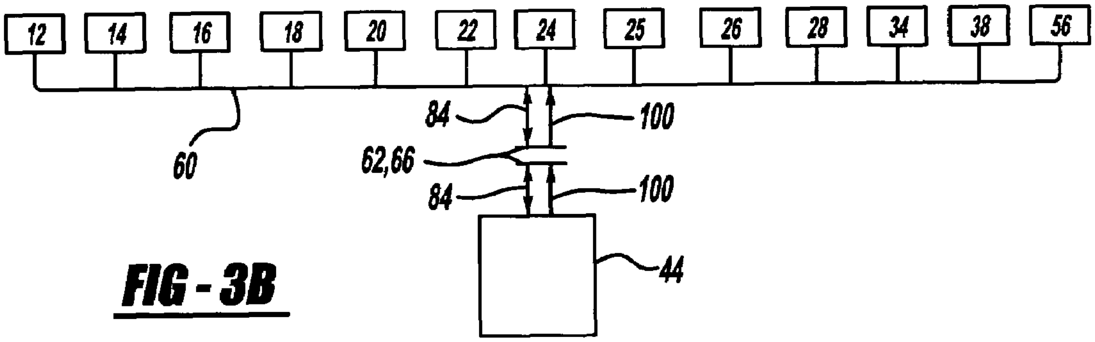
FIG. 3B is a schematic illustration of a network of external electronic devices having a common software interface with the first electronic controller of FIGS. 1 and 3A.

Within the scope of the invention, some or all of the external electronic devices may be interconnected to form a network. Referring to FIG. 3B, the external electronic devices included on the vehicle 10A of FIG. 1 are connected to form a network 60 (i.e., the engine diagnostic unit 12, the HVAC 14, the navigational system 16, the phone 18, the vehicle sensor 20, the entertainment system 22, the Internet system 24, the digital broadcast system 25, the video system 26, the vehicle audio systems 28A–28B, the windows 34A–34D, the seats 38A–38D and seat display screens 56A–56B form a network 60). The network 60 (and, therefore, the above-listed external electronic devices) and the controller 44 share a common software interface 62. The software interface 62 enables the networked external electronic devices to send data 84 to the controller 44 to receive and to process control signals 100 sent by the controller 44. If a common software interface 62 is not initially present (i.e., is not preinstalled in both the network 60 and the controller 44), there is at least a common communication protocol 66 allowing communication between the devices and the controller 44 sufficient to cause the transfer of the necessary software either from the controller 44 to the devices (in the form of data 84) or from the devices to the controller 44 (also in the form of data 84) to establish the common software interface 62. The ability to achieve a common communication protocol between networked and non-networked electronic devices will be recognized by those skilled in the art. For instance, industry standards, such as an IEEE 1394 bus, have been developed which allow various independent electronic devices to connect, communicate and function with one another. Those skilled in the art are aware of software architecture with common core requirements for networked and non-networked electronic devices to allow for automatic connection and operability of portable devices via the network. Thus, non-networked or "add-on" electronic devices may be controlled by the controller 44.

To establish operational control over external electronic devices in a specific area, such as Area A or B in FIG. 1, the operator of the controller 44 selects an area from a listing of available areas displayed on the display screen 94A, as in FIG. 3A. The list may be established via a software program stored on one or more of the devices that has categorized the devices into groups (i.e., areas). The program is communicated via the software interface 62 to the communication component 80A when an operator initiates communication between the devices and the controller 44. The common software interface 62 of FIG. 3B may include a software program written to establish exclusive control to the operator over the external electronic devices located in the selected area. Alternatively, the program may allow partial access by others to devices in the operator's previously selected zone. For example, a left rear seat passenger/operator who selects area A, may opt to allow the right rear seat passenger to simultaneously view (on a screen outside of the selected zone A (e.g., screen 56B in area B)) a video playing on video system 26 located in the selected zone A (and, therefore, controlled by the left rear seat passenger). The left rear seat passenger/operator may choose not to grant access to the right rear seat passenger to control over the starting, stopping, rewinding, etc. of the video system 26. These sharing and exclusion features may appear as prompts on the left rear seat passenger's/operator's controller display, allowing the operator to set the access conditions for his or her zone. For example, the exclusion feature may be established by a prompt asking the operator to choose and enter a password into the operator input component of his or her controller; the password is thus necessary for other passengers to gain access to the control over electronic devices in the operator's selected zone.

Referring again to FIG. 1, when the portable electronic controller 44 is used to select the first area A, as discussed above, it may send a control signal representing a preferred setting of audio volume to the audio system 28A. Additionally, when the electronic controller 44 is used to select the second area B, it may send the same preferred audio level setting to the audio system 28B located in area B. Also, when the electronic device 44 is taken out of the vehicle 10A and positioned in the vehicle 10B of FIG. 2B, it may be to send the stored, preferred setting of audio volume to the audio system 28C of the vehicle 10B. Furthermore, when the electronic controller 44 is taken to the building 64 of FIG. 2A, it may be used to send the preferred volume level setting to the home audio system 68. Thus, the stored setting representing preferred audio level may be stored in the portable electronic controller 44 and carried by an individual with him or her as he or she travels within a given surrounding environment (e.g., within a vehicle 10A (from zone A to zone B)), to another surrounding environment (e.g., to vehicle 10B or to a further remote location such as a building 64), thus allowing the individual to conveniently access and control an adjacent audio system 28, 68 according to his or her preferences. In fact, the electronic controller 44 may store a myriad of preferred settings correlating to a multitude of external electronic devices. For instance, the electronic controller 44 may access and control the engine diagnostic unit 12, the HVAC 14, the navigational system 16, the phone 18, the entertainment system 22, the Internet system 24, the digital broadcast system, the video system 26, and the vehicle audio system 28A–C. It may also access the vehicle sensor 20. By integrating the controls for these separate electronic devices, a vehicle may be equipped with fewer device-specific controls; thus, an individual, integrated controller may be a cost-saving feature. Increasingly, electronically-controlled vehicles, such as those with by-wire functionality (i.e., vehicles having a braking system, a steering system, an energy conversion system and/or a suspension system that is responsive to non-mechanical control signals) may especially benefit from such integration.

As an alternative to storing one preferred setting to be applied to all external electronic devices of a given type in different surrounding areas that the controller is used in (e.g., one audio volume level to be applied to audio system 28A in vehicle 10A and then to audio system 28C in vehicle 10B when the controller is taken from vehicle 10A to vehicle 10B), the operator may choose to store a preferred audio volume level for vehicle 10A and store a different (e.g., louder) preferred audio volume level for vehicle 10B. Thus, duplicate sets of preferred settings for different external electronic components having the same function are possible. The processing component may be equipped to recognize which of equivalent-function electronic devices it is communicating with, and thus automatically send the correct respective stored preference to control the electronic device (e.g., the controller would recognize that it is communicating with audio system 28A rather than audio system 28B, and thus send the preferred setting for audio system 28A). This may be accomplished via component-specific (or network-specific) identity code data that is received by the controller. One of the multiple stored preferences for equivalent devices may be chosen by the operator as a "default" preference. When the controller interacts with an external electronic device that is has not yet controlled (i.e., no device-specific preference is yet stored), the controller will then automatically send the default preference to the new external electronic device. For example, if the controller 44 of FIG. 1 is taken to a third vehicle, not shown, and if the audio level preferred setting for audio system 28A of vehicle 10A (rather than the stored preferred setting for audio system 28C of vehicle 10B) has been chosen as the default audio level preference, the controller 44 will apply the default setting for audio system 28A to an audio system in the third vehicle. Alternatively, the operator may choose to enter a specific audio level setting to be applied to the audio system of the third vehicle (rather than use the default setting), and may even store this new setting as another stored audio level preferred setting.

Within the scope of the invention, a preferred setting may be stored as an "absolute value" measurement rather than a device-specific setting level. For instance, a preferred audio level may be stored in decibels, rather than as "volume level 5 of 8" for a given audio system. A preferred climate temperature may be stored as 75 degrees Fahrenheit rather than as "high heat" for a given HVAC system.

The processing component of the controller may include an algorithm that enables the controller to "learn" an operator's preferences (rather than requiring the operator to actually input a preferred setting) and automatically control selected external electronic devices in accordance with these learned preferences. For instance, even if an operator does not store a preferred audio volume level setting, if the controller repeatedly receives operator input corresponding to a given setting (i.e., substantially identical operator input corresponding to a substantially identical formulated control signal), the controller will "learn" that the operator prefers such a setting, and may automatically set the audio volume to such a preferred setting (i.e., the processing component will formulate a substantially identical control signal based on the learned operator input and in the absence of "new" operator input). (The operator may choose to override the automatic setting by inputting a different setting.) The communication component may be able to receive time data from an external electronic device (or the controller may include an integral, controller-mounted (internal) clock). Referring to FIG. 3A, a controller-mounted data measuring element 86A, which may be a clock, is operatively connected to the processing component 92A. Accordingly, the controller may "learn" the operator's preferences in a time-based manner (e.g., the controller may "learn" a preference for easy listening music in the morning and news radio in the afternoon), and may, in accordance with this learned information, automatically (i.e., without new operator input) send a control signal to set the external electronic device (e.g., the default station to which the audio system is tuned) at various times of the day to reflect these preferences.

The controller may also be equipped with one or more controller-based sensors that enable the controller to closely monitor surrounding conditions and send control signals to external electronic devices to keep the conditions in accordance with an operator's preferences (whether stored on or learned by the controller). For instance, referring to FIG. 3A, the controller-mounted data measuring element 86A may be a sensor mounted to the controller 44 and operatively connected to the data storage component 88A. The sensor monitors a surrounding condition, such as air temperature, and sends data representing the air temperature to the data storage component 88A. The data is then processed by the processing component 92A. The control signal 100 formulated by the processing component 92A and sent to the HVAC system 14 of FIG. 1 is then based upon a comparison of the sensor-measured temperature and the preferred temperature setting (whether stored as a preference or input by the operator) and reflects any adjustment to the HVAC system necessary to establish a sensor-measured temperature that is the same as the preferred setting.

Figure 4:
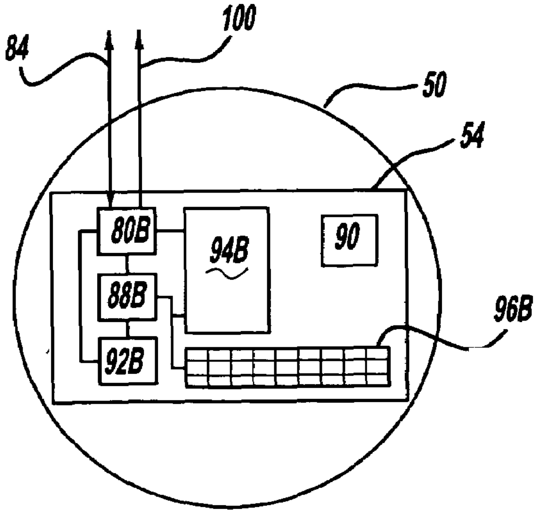
FIG. 4 is a schematic illustration in plan view of the second electronic controller of FIG. 1.

Referring now to FIG. 4, the second electronic controller 54 of FIG. 1 is shown in greater detail. Like the first electronic controller 44, the second electronic controller 54 includes a communication component 80B, a data storage component 88B, a processing component 92B, an operator input component 96B and an integral display 94B, each of which functions and are interconnected as described above with respect to the like components of the first electronic controller 44.

The electronic controller 54 also includes a lockout component 90. Referring again to FIG. 1, the lockout component 90 is operatively connected to a vehicle operation sensor 98. The vehicle operation sensor 98 is mounted to the vehicle 10A, and senses when the vehicle 10A is being driven. For example, the vehicle operation sensor 98 may be a speed sensor connected to a vehicle axle to sense rotational speed, an indicator of whether the vehicle is being driven. The lockout component 90 prevents the second electronic controller 54 from sending control signals 100 to one or more of the external electronic devices (such as the Internet system 24) when the vehicle operation sensor 98 senses that the vehicle 10A is being driven. Thus, the operator of the second electronic controller 54, i.e., the driver of the vehicle 10A, is prevented from accessing at least one of the external electronic devices (such as the Internet system 24) while he or she is driving the vehicle 10A. The second electronic controller 54 is also selectively connectable to the external displays 56A, 56B for selectively displaying data received by the electronic controller 54 thereon.

Figure 5:
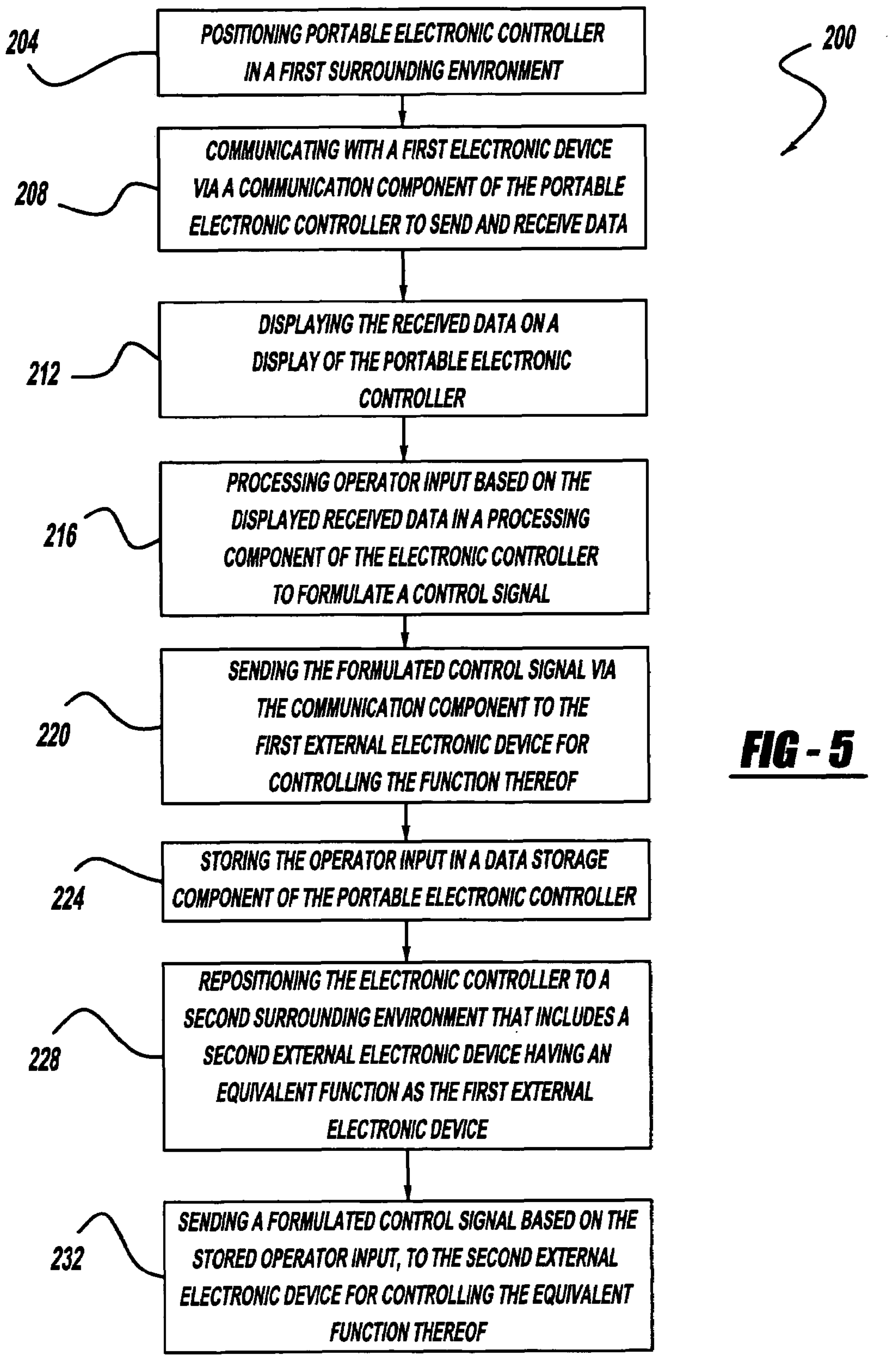
FIG. 5 is a flow diagram illustrating a method of controlling external electronic devices on a vehicle.

Referring to FIG. 5, a method 200 of controlling external electronic devices located in a first surrounding environment via a portable electronic controller is illustrated. The external electronic devices include a first external electronic device. The method 200 includes positioning 204 the portable electronic controller in the first surrounding environment. The method 200 further includes communicating 208 with a first electronic device via a communication component of the portable electronic controller to send data to and to receive data from the first external electronic device. The external electronic devices and the communication component have a common software interface enabling such communication.

The method 200 further includes displaying 212 the received data on an integral display of the portable electronic controller. The method 200 further includes processing 216 operator input in a processing component of the electronic controller to formulate a control signal. The operator input is based on the displayed received data and is applied to an operator input component of the electronic device. The method 200 further includes sending the formulated control signal 220 via the communication component to the first external electronic device for controlling the function thereof.

Under the method 200, the operator input may represent a preferred setting of the first external electronic device. The method 200 may further include storing 224 the operator input in a data storage component of the portable electronic controller. The method 200 may further include repositioning 228 the electronic controller to a second surrounding environment that is different than the first surrounding environment and has other external electronic devices, including a second external electronic device. The first and second external electronic devices have an equivalent function. The method 200 may further include sending another formulated control signal 232 to the second external electronic device for controlling the equivalent function thereof. This other formulated control signal is formulated based on the stored operator input representing the preferred setting.

While the best modes for carrying out the invention have been described in detail, those familiar with the art to which this invention relates will recognize various alternative designs and embodiments for practicing the invention within the scope of the appended claims.

The invention claimed is:

1. A portable electronic controller adapted for controlling the operation of external electronic devices, the portable electronic controller comprising:

a communication component;

an integral display operatively connected to said communication component;

an operator input component operatively connected to said integral display;

a processing component operatively connected to said operator input component, to said communication component and to said integral display;

wherein the communication component has a software interface common with the external electronic devices to be controlled; wherein the communication component communicates with said external electronic devices via said common software interface to receive data from and to send data and control signals to said external electronic devices, wherein said control signals control the operation of selected ones of said external electronic devices; and wherein the processing component processes an operator's input to the operator input component and the data received by the communication component to formulate said control signals to be sent by said communication component for controlling said external electronic devices;

the external electronic devices are located in a first surrounding environment, wherein the first surrounding environment includes and is at least partly defined by at least a first area and a second area, wherein the first and second areas are different from one another, wherein said external electronic devices include a first set of external electronic devices located in said first area and a second set of external electrical components located in said second area;

wherein the data received by said communication component from said external electronic devices includes a listing of said first and second areas; wherein said listing of said areas is displayed on said integral display, wherein an operator's input to said operator input component includes a selection of one of said listed areas;

wherein the data sent to said external electronic devices from said communication component includes said selection of one of said listed areas, and wherein said selection establishes operational control of said external electronic devices in said one of said listed areas by said control signals sent from said communication component.

2. The portable electronic controller of claim 1, further comprising:

a data storage component operatively connected to said communication component and to said processing component and able to store an operator's input to said operator input component and data received by said communication component.

3. The portable electronic controller of claim 2, wherein said electronic controller is selectively connectable to an external display screen for displaying said stored data on said display screen.

4. The portable electronic controller of claim 2, wherein said data storage component stores said operator's input, wherein said processing component includes an algorithm characterized by the ability to compare operator input being processed with stored operator input and thereby identify repeated processing of substantially identical operator input and respective formulation of substantially identical control signals, and wherein said processing component selectively formulates such a substantially identical control signal to be sent by said communication component in the absence of an operator's input.

5. The portable electronic controller of claim 4, wherein said processing component further processes time data, wherein said time data is received by said communication component from one of said external electronic devices or is relayed to said processing component by a clock mounted to said portable electronic controller and operatively connected to said processing component, wherein said algorithm is further able to identify the times of entry of said identical operator input based upon said time data, and wherein said selective formulation of said identical control signal to be sent in the absence of an operator's input is correlated with said identified times of entry.

6. The portable electronic controller of claim 2 in combination with the external electronic devices, wherein said communication component and at least one of such external electronic devices have a common communication protocol permitting said communication component to receive data from said at least one of said external electronic devices, and wherein said data is stored in said data storage component and processed by said processing component to establish said common software interface, thereby permitting said communication component to send data and control signals to said at least one of said external electronic devices.

7. The portable electronic controller of claim 2, further comprising:

a sensor mounted to the controller and operatively connected to said data storage component, wherein said sensor measures a surrounding condition, wherein said sensor sends data representing said surrounding condition to said data storage component, and wherein said processing component processes said data representing said surrounding condition in formulating said control signals.

8. The portable electronic controller of claim 1 including the external electronic devices, wherein said external electronic devices are operatively connected to form a network, and wherein said external electronic devices are operatively connected to said common software interface via said network.

9. The portable electronic controller of claim 1, wherein the operational control established in said one of said listed areas by said selection excludes another portable electronic controller from establishing operational control of said one of said listed areas.

10. The portable electronic controller of claim 1 in combination with the external electronic devices:

wherein said external electronic devices are located in a first surrounding environment, wherein said electronic controller is portable to a second surrounding environment, wherein other external electronic devices are located in said second environment;

wherein said communication component and said other external electronic devices have said common software interface;

wherein said communication component communicates with said other external electronic devices via said common software interface to receive data from and to send data and control signals to said other external electronic devices, wherein said control signals sent to said other external electrical components control the operation of selected ones of said other external electronic devices; and wherein said processing component processes an operator's input to said operator input component and the data received by the communication component to formulate said control signals to be sent by said communication component for controlling said other external electronic devices.

11. The portable electronic controller of claim 1, wherein said external electronic devices are located on a vehicle, and wherein said external electronic devices are selected from the group consisting of an on-board engine diagnostic unit, on-board sensors, a vehicle video system, a vehicle audio system, a vehicle heating, ventilation and air conditioning (HVAC) system, display screen, vehicle windows, and vehicle seats.

12. The portable electronic controller of claim 1, wherein said external electronic devices are selected from the group consisting of a satellite-based navigation system, a phone, a satellite-based entertainment system, an Internet access component, and a digital broadcast system.

13. The portable electronic controller of claim 1, wherein said external electronic devices are located at a building and are selected from the group consisting of an audio system, a security system for the building, lighting for the building and electronic appliances.

14. The portable electronic controller of claim 1, wherein said communication component receives said data from and sends said formulated control signals to said external electronic devices in a plug-and-play manner.

15. The portable electronic controller of claim 1, wherein said communication component receives said data from and sends said formulated control signals to said external electronic devices in a wireless manner.

16. The portable electronic controller of claim 1, wherein said external electronic devices are located on a vehicle, and further comprising:

a second electronic controller mounted to the vehicle and able to receive operator input and data from said external electronic devices, and further able to send control signals to said external electronic devices for controlling the function thereof;

a vehicle operation sensor mounted to the vehicle for sensing when the vehicle is being driven;

a lockout component operatively connected to said vehicle operation sensor and to said second electronic controller;

wherein said lockout component prevents said second electronic controller from sending control signals to at least one of said external electronic devices when said vehicle operator sensor senses that the vehicle is being driven.

17. A vehicle including:

a structure frame;

a portable electronic controller adapted for controlling the operation of external electronic devices;

electronic devices external to the portable electronic controller and mounted with respect to the structural frame and able to send data and receive control signals;

wherein the portable electronic controller includes:

a communication component able to send and receive data and send control signals; an integral display operatively connected to said communication component; an operator input component operatively connected to said integral display; a processing component operatively connected to said operator input component, to said communication component and to said integral display; a data storage component operatively connected to said communication component and to said processing component and able to store an operator's input to said operator input component and data received by said communication component;

wherein said communication component and said external electronic devices have a common software interface; wherein said communication component communicates with said external electronic devices via said common software interface to receive said data from and to send said data and said control signals to said external electronic devices, wherein said control signals control the operation of respective ones of said external electronic devices;

wherein said processing component processes an operator's input to the operator input component and said data received by the communication component to formulate said control signals to be sent by said communication component for controlling the operation of said external electronic devices;

wherein said structural frame of the vehicle is at least partly defined by a first area and a second area, wherein said first and second areas are different from one another, wherein said external electronic devices include a first set of external electronic devices located in said first area and a second set of external electrical devices located in said second area;

wherein said data received by said communication component from said external electronic devices includes a listing of said first and second areas, wherein said listing of said areas is displayed on said integral display, wherein an operator's input to said operator input component includes a selection of one of said areas; and wherein said data sent to said external electronic devices from said communication component includes said selection of one of said listed areas, and wherein said selection establishes operational control of respective ones of said external electronic devices in said one of said listed areas by said control signals sent from said communication component.

18. A method of controlling external electronic devices located in a first surrounding environment via a portable electronic controller, wherein said external electronic devices include a first external electronic device, the method comprising:

positioning said portable electronic controller in said first surrounding environment;

communicating with said first external electronic device via a communication component of said portable electronic controller to send data to and to receive data from said first external electronic device, wherein said external electronic devices and said communication component have a common software interface enabling such communication;

displaying said received data on an integral display of said portable electronic controller;

processing an operator's input to an operator input component of said electronic controller in a processing component of said electronic controller to formulate a control signal, wherein said operator's input is based on said displayed received data;

sending said formulated control signal via said communication component to said first external electronic device for controlling the function thereof;

storing said operator's input in a data storage component of said portable electronic controller;

repositioning said electronic controller to a second surrounding environment that is different than said first surrounding environment and includes other external electronic devices, including a second external electronic device, wherein said first and second external electronic devices have an equivalent function; and sending another formulated control signal to said second external electronic device for controlling the equivalent function thereof, wherein said another formulated control signal is formulated based upon said stored operator's input representing said preferred setting.

* * * * *